United States Patent
Ashikawa (10) Patent No.: US 9,147,432 B2
(45) Date of Patent: Sep. 29, 2015

(54) HEAD CLEANING DEVICE AND DRIVE DEVICE

(71) Applicant: FUJIFILM CORPORATION, Minato-ku, Tokyo (JP)

(72) Inventor: Teruo Ashikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/523,953

(22) Filed: Oct. 27, 2014

(65) Prior Publication Data

US 2015/0043105 A1 Feb. 12, 2015

Related U.S. Application Data

(63) Continuation of application No. PCT/JP2013/062493, filed on Apr. 26, 2013.

(30) Foreign Application Priority Data

May 11, 2012 (JP) .................................. 2012-109997

(51) Int. Cl.
*G11B 5/41* (2006.01)
*G11B 23/50* (2006.01)
*G11B 19/26* (2006.01)

(52) U.S. Cl.
CPC ................ *G11B 23/502* (2013.01); *G11B 5/41* (2013.01); *G11B 19/26* (2013.01)

(58) Field of Classification Search
CPC .... G11B 23/049; G11B 23/502; G11B 19/26; G11B 5/41
USPC ......................................................... 260/128
See application file for complete search history.

(56) References Cited

U.S. PATENT DOCUMENTS

| 3,731,289 | A | * | 5/1973 | Bajgert et al. | 360/128 |
|---|---|---|---|---|---|
| 4,843,508 | A | * | 6/1989 | Mannheimer et al. | 360/128 |
| 5,170,304 | A | * | 12/1992 | Katohno et al. | 360/128 |
| 5,671,108 | A | * | 9/1997 | Clausen | 360/128 |
| 6,021,026 | A | * | 2/2000 | Dallago | 360/128 |
| 6,252,739 | B1 | * | 6/2001 | Todd et al. | 360/128 |
| 6,333,831 | B1 | * | 12/2001 | Todd | 360/128 |
| 6,590,742 | B2 | * | 7/2003 | Yamakawa | 360/128 |
| 6,987,647 | B2 | * | 1/2006 | Osaki et al. | 360/128 |
| 7,292,410 | B2 | * | 11/2007 | Nayak et al. | 360/128 |
| 8,477,448 | B2 | * | 7/2013 | Thompson et al. | 360/92.1 |
| 8,488,273 | B2 | * | 7/2013 | Hori et al. | 360/128 |
| 8,749,921 | B2 | * | 6/2014 | Mori | 360/128 |

FOREIGN PATENT DOCUMENTS

| JP | H09-330507 A | 12/1997 |
|---|---|---|
| JP | H11-296827 A | 10/1999 |

* cited by examiner

*Primary Examiner* — Angel Castro
(74) *Attorney, Agent, or Firm* — Solaris Intellectual Property Group, PLLC (57) ABSTRACT

A head cleaning device includes: a wiper member formed in an elongate shape and having a wiper anchoring portion anchored so as not to move in a tape width direction; and a support member that includes a wiper entrainment portion about which the wiper member is entrained so as to double back, that causes the wiper entrainment portion to move in the tape width direction so that a surface of the wiper member at an opposite side of the wiper entrainment portion from the wiper anchoring portion wipes a head that performs at least one of writing information to, or reading information from, a recording tape.

15 Claims, 6 Drawing Sheets

HEAD CLEANING DEVICE AND DRIVE DEVICE

CROSS-REFERENCE TO RELATED APPLICATIONS

This application is a continuation application of International Application No. PCT/JP2013/062493, filed Apr. 26, 2013, the disclosure of which is incorporated herein by reference in its entirety. Further, this application claims priority from Japanese Patent Application No. 2012-109997, filed May 11, 2012, the disclosure of which is incorporated herein by reference in its entirety.

TECHNICAL FIELD

The present invention relates to a head cleaning device and a drive device including the head cleaning device.

BACKGROUND ART

A head cleaning device configured to clean a head while separating a tape from the head has conventionally been proposed (e.g., see Japanese Patent Application Laid-open (JP-A) No. H11-296827). Furthermore, a head cleaning device configured to clean a head by means of a mechanism that is driven when a tape cassette is loaded has also conventionally been proposed (e.g., see JP-A No. H9-330507).

SUMMARY OF INVENTION

Technical Problem

In this connection, dirt sticking to the head as a result of the tape making sliding contact with the head sticks to the head along the traveling direction of the tape (the tape lengthwise direction), so ideally the direction in which the head is cleaned should coincide with the tape width direction intersecting the tape lengthwise direction.

However, in the head cleaning device described in JP-A No. H11-296827, the tape is separated from the head by a support arm that rotates with its axial direction coincident with the tape width direction, and the head is cleaned with a cleaning brush attached to the distal end of the support arm, so the direction in which the head is cleaned coincides with the tape lengthwise direction. Furthermore, in the head cleaning device described in JP-A No. H9-330507, the direction in which the head is cleaned coincides with the tape width direction, but the configuration of the device itself is complicated.

Therefore, it is an object of the present invention to obtain a head cleaning device in which the cleaning direction is made coincident with the tape width direction and which can clean the head with a simple configuration and a drive device including the head cleaning device.

Solution to Problem

In order to achieve the above-described object, a head cleaning device of a first aspect pertaining to the present invention includes: a wiper member formed in an elongate shape and having a wiper anchoring portion anchored so as not to move in a tape width direction; and a support member that includes a wiper entrainment portion about which the wiper member is entrained so as to double back, that causes the wiper entrainment portion to move in the tape width direction so that a surface of the wiper member at an opposite side of the wiper entrainment portion from the wiper anchoring portion wipes a head that performs at least one of writing information to, or reading information from, a recording tape.

According to the first aspect pertaining to the present invention, the wiper member moves in the tape width direction and cleans the head as a result of the wiper entrainment portion of the support member being moved in the tape width direction. Accordingly, the cleaning direction is made coincident with the tape width direction and the head can be cleaned with a simple configuration.

Furthermore, according to a head cleaning device of a second aspect pertaining to the present invention, in the head cleaning device of the first aspect, the wiper member may be configured in a loop, and the support member may be disposed at an inner side of the wiper member such that the wiper member doubles back at both ends in a movement direction of the support member.

According to the second aspect pertaining to the present invention, the configuration of the head cleaning device can be simplified.

Furthermore, a head cleaning device of a third aspect pertaining to the present invention, in the head cleaning device of the first or second aspect, may further include: a belt member formed in an elongate shape and having a belt anchoring portion anchored so as not to move in the tape width direction, and a guide member that includes a belt entrainment portion about which the belt member is entrained in so as to double back, and that causes the belt entrainment portion to move in the tape width direction so as to separate the recording tape from the head while causing a surface of the belt member on the belt anchoring portion side of the belt entrainment portion to contact the recording tape.

According to the third aspect pertaining to the present invention, the belt member moves in the tape width direction, contacts the recording tape, and separates the recording tape from the head as a result of the belt entrainment portion of the guide member being moved in the tape width direction. That is, according to the present invention, the head can be cleaned while the recording tape is separated from the head.

Furthermore, according to a head cleaning device of a fourth aspect pertaining to the present invention, in the head cleaning device of the third aspect, the belt member may be configured in a loop, and the guide member may be disposed at an inner side of the belt member such that the belt member doubles back at both ends in a movement direction of the guide member.

According to the fourth aspect pertaining to the present invention, the configuration of the head cleaning device can be simplified.

Furthermore, according to a head cleaning device of a fifth aspect pertaining to the present invention, in the head cleaning device of the third or fourth aspect, the wiper entrainment portion of the support member and the belt entrainment portion of the guide member may be configured to move simultaneously.

According to the fifth aspect pertaining to the present invention, the head can be cleaned while the recording tape is separated from the head by the single act of moving in the tape width direction.

Furthermore, according to a head cleaning device of a sixth aspect pertaining to the present invention, in the head cleaning device of any of the third to fifth aspects, the belt member and the guide member may be both disposed at both tape lengthwise direction sides of the wiper member and the support member.

According to the sixth aspect pertaining to the present invention, the cleaning of the head can be excellently accomplished while the recording tape is separated from the head.

Furthermore, according to a head cleaning device of a seventh aspect pertaining to the present invention, in the head cleaning device of the sixth aspect, the belt member and the guide member may project further toward a wiping motion side in the tape width direction than the wiper member and the support member.

According to the seventh aspect pertaining to the present invention, the cleaning of the head can be excellently accomplished while the recording tape is separated from the head.

Furthermore, a head cleaning device of an eighth aspect pertaining to the present invention includes: a belt member formed in an elongate shape and having a belt anchoring portion anchored so as not to move in a tape width direction; a guide member including a belt entrainment portion about which the belt member is entrained so as to double back, and that causes the belt entrainment portion to move in the tape width direction so as to separate the recording tape from the head while causing a surface of the belt member on the belt anchoring portion side of the belt entrainment portion to contact the recording tape; and a cleaning member which, by moving in the tape width direction, cleans a head that performs at least one of writing information to, or reading information from, a recording tape.

According to the eighth aspect pertaining to the present invention, the belt member moves in the tape width direction, contacts the recording tape, and separates the recording tape from the head as a result of the belt entrainment portion of the guide member being moved in the tape width direction. That is, according to the present invention, the cleaning direction is made coincident with the tape width direction, and the head can be cleaned while the recording tape is separated from the head, with a simple configuration.

Furthermore, a head cleaning device of a ninth aspect pertaining to the present invention includes: a wiper member that is entrained about a support member in a loop and that has an axial direction that is coincident with a tape lengthwise direction, with a part of the wiper member being anchored to a base member fixed to a device body of a drive device, and that, due to the support member moving in a tape width direction, wipes a head that performs at least one of writing information to, or reading information from, a recording tape; belt members entrained about guide members in loops and having an axial direction that is coincident with the tape lengthwise direction, the guide members being disposed at both tape lengthwise direction sides of the support member so as to project further toward a wiping motion side in the tape width direction than the support member, with parts of the belt members being anchored to the base member, and the belt members separating the recording tape from the head while contacting the recording tape, due to the guide members moving in the tape width direction; and a moving mechanism that moves the support member and the guide members in the tape width direction.

According to the ninth aspect pertaining to the present invention, the cleaning direction is made coincident with the tape width direction, and the head can be cleaned while the recording tape is separated from the head, with a simple configuration.

Furthermore, a drive device of a tenth aspect pertaining to the present invention includes: a head that performs at least one of writing information to, or reading information from, a recording tape while contacting the recording tape, which is traveling; a tape drive mechanism that causes the recording tape to travel reciprocally; and the head cleaning device according to any of the first to ninth aspects.

According to the tenth aspect pertaining to the present invention, the cleaning direction is made coincident with the tape width direction and the head can be cleaned with a simple configuration.

Furthermore, according to a drive device of an eleventh aspect pertaining to the present invention, in the drive device of the tenth aspect, the tape drive mechanism may have a pair of reels that retain the recording tape such that they can pay out and take up the recording tape, and that may be non-removably built into a device body.

According to the eleventh aspect pertaining to the present invention, the cleaning direction is made coincident with the tape width direction and the head can be cleaned with a simple configuration in the drive device into which the pair of reels are non-removably built. Advantageous Effects of Invention As described above, according to the present invention, the cleaning direction is made coincident with the tape width direction and the head can be cleaned with a simple configuration.

DESCRIPTION OF EMBODIMENT

An embodiment pertaining to the present invention will be described in detail below on the basis of the drawings. For convenience of description, arrow UP in FIG. 1 indicates an upward direction, arrow DO indicates a downward direction, and a rotational axis direction of reels 10 and 20 pertaining to the present embodiment is made coincident with the up and down direction (height direction). Furthermore, first an overview of a drive device 50 in which the reels 10 and 20 are non-removably disposed will be described, and then the configuration of a head cleaning device 30 will be described in detail.

<Overview of Drive Device>

Figure 1:
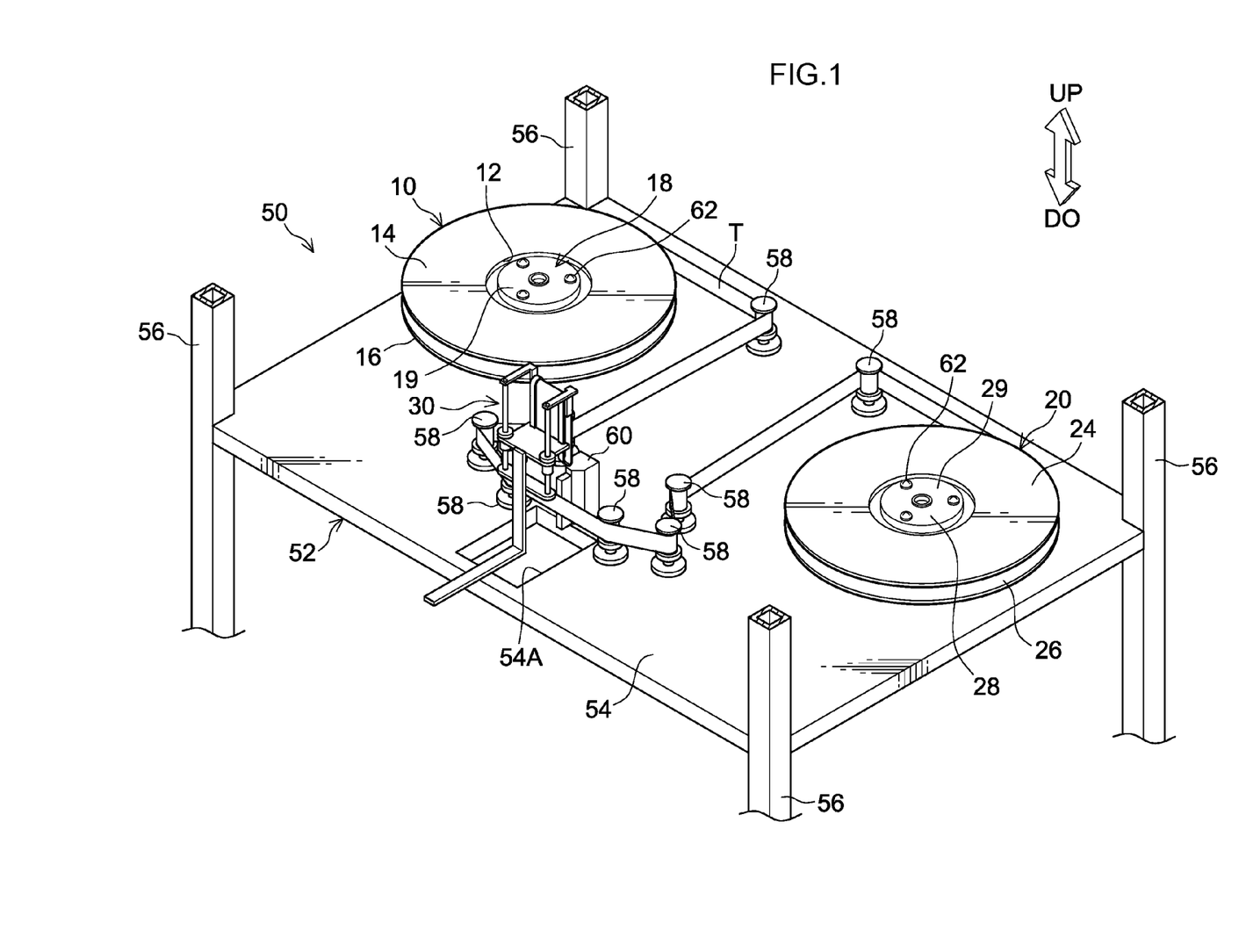
FIG. 1 is a perspective view showing a head cleaning device a pair of reels non-removably built into a drive device.

The reels 10 and 20 pertaining to the present embodiment are made of a synthetic resin material such as polycarbonate (PC), for example, and molded in the same shape. Additionally, as shown in FIG. 1, the reels 10 and 20 are disposed as a pair inside a casing 52 (in FIG. 1, only a bottom plate 54 and three struts 56 are shown) serving as a device body of the drive device 50.

The reel 10 is for paying out a recording tape (magnetic tape) T serving as an information recording and playback medium, the reel 20 is for taking up the recording tape T, and the recording tape T that is paid out from the reel 10 and travels makes sliding contact with, while being taken up onto the reel 20, a head 60 that performs at least one of record (write) data (information) to and play back (read) data (information) from the recording tape T.

On the bottom plate 54 on both sides of the head 60, plural (those shown in the drawings include four on each side for a total of eight) tape guides 58 are disposed in such a way that they may freely rotate, and the recording tape T pulled out from the reel 10 and taken up onto the reel 20 is guided by the tape guides 58. Additionally, the head 60 makes sliding contact with a recording surface of the recording tape T stretched between the tape guides 58 on both sides.

Furthermore, the reels 10 and 20 are configured to include: substantially cylindrical reel hubs 12 and 22 that include, on their rotational center sides, short cylinder-like axial center portions 18 and 28 having top plates 19 and 29; annular upper flanges 14 and 24 serving as first flanges that are disposed at upper end portion sides of the reel hubs 12 and 22; and annular lower flanges 16 and 26 serving as second flanges that are disposed at lower end portion sides of the reel hubs 12 and 22.

Additionally, the recording tape T is wound around the outer peripheral surface of the reel hub 12 of the reel 10, and end portions (edge portions) in the width direction of the wound recording tape T are retained by the upper flange 14 and the lower flange 16. Furthermore, the recording tape T paid out from the reel 10 is wound around the outer peripheral surface of the reel hub 22 of the reel 20, and the end portions (edge portions) in the width direction of the recording tape T are retained by the upper flange 24 and the lower flange 26.

"Substantially cylindrical" in the present embodiment also includes: having a generally solid cylindrical shape, in which the shapes of the outer peripheral surfaces (winding surfaces) of the reel hubs 12 and 22 around which the recording tape T is wound are formed in the shape of a drum or the like; and having a hollow shape that is not completely cylindrical, in which ribs or the like are projectingly disposed at the inner peripheral surface sides of the reel hubs 12 and 22.

Furthermore, a motor (not shown in the drawings) that configures a tape drive mechanism together with the reels 10 and 20 is disposed in the drive device 50, and a pair of rotation transmitting members (not shown in the drawings) to which rotational driving force is transmitted from a rotating shaft (not shown in the drawings) of the motor are rotatably disposed inside a pair of open portions (not shown in the drawings) formed in the casing 52 (the bottom plate 54) of the drive device 50.

Additionally, screw hole portions (not shown in the drawings) are formed in a circumferential direction in the axial center portions 18 and 28 of the reels 10 and 20, and the reels 10 and 20 are integrally fastened and fixed to the rotation transmitting members by inserting screws 62 (see FIG. 1) through the screw hole portions and screwing the screws 62 into the rotation transmitting members. Because of this, the reels 10 and 20 have a configuration where they are non-removably built into the casing 52 of the drive device 50.

<Configuration of Head Cleaning Device>

Next, the configuration of the head cleaning device 30, whose cleaning direction is coincident with the tape width direction and which cleans the head 60 while separating the recording tape T from the head 60, will be described in detail. There will be cases below where the side of the head cleaning device 30 that opposes a surface 60A of the head 60 is referred to as a front side and where the opposite side is referred to as a back side.

As shown in FIG. 1 to FIG. 4, the head cleaning device 30 is disposed opposing the surface 60A of the head 60. The head cleaning device 30 has a wiper member (a cleaning member) 32 that moves in the tape width direction and wipes (cleans) the surface 60A of the head 60 and a pair of belt members 36 that are disposed at both tape lengthwise direction sides of the wiper member 32, and separate (clear) the recording tape T from the surface 60A of the head 60 while moving in the tape width direction.

The wiper member 32 is configured by forming an elongate band-like member in a loop, and a support member 34 in a substantially tabular shape that moves in the tape width direction is disposed at an inner side of the wiper member 32. That is, the support member 34 is disposed at an inner side of the wiper member 32 in such a way that the wiper member 32 doubles back at both end portions in the movement direction (an upper end portion 34A and a lower end portion 34B shown in FIG. 3 and FIG. 5B) of the support member 34.

Figure 3:
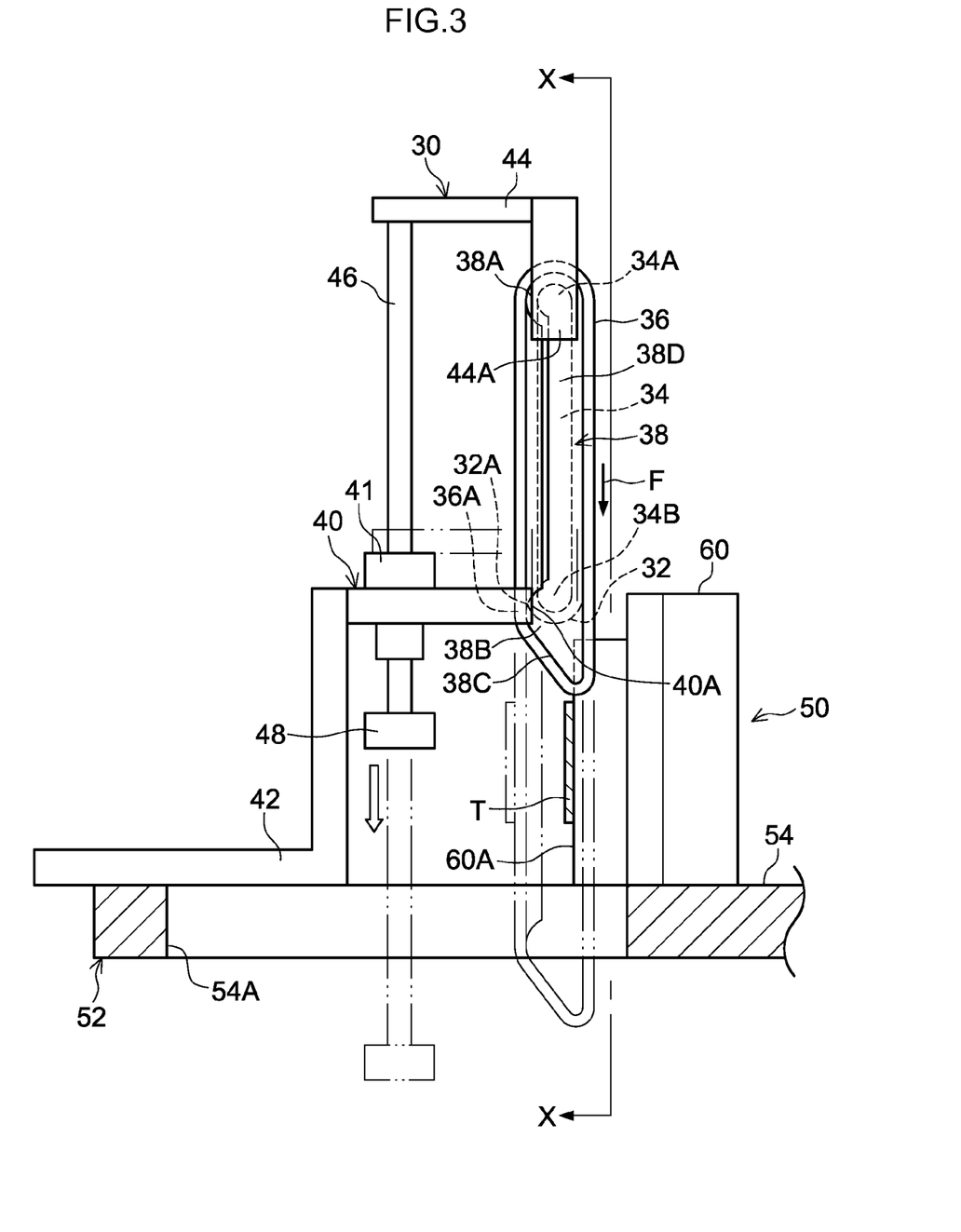
FIG. 3 is a side view showing the configuration of the head cleaning device pertaining to the embodiment.

Additionally, the lower end portion 34B of the support member 34 serves as a wiper entrainment portion about which the wiper member 32 is entrained in such a way as to double back, and the wiper member 32 is entrained with its axial direction coincident with the tape lengthwise direction about the support member 34 in such a way that the wiper member 32 can slide (rotationally move) in both forward and reverse directions with respect to the support member 34.

Specifically, the upper end portion 34A and the lower end portion 34B of the support member 34 are configured as circular arc surfaces whose diameter is larger than the plate thickness of the support member 34 as seen in the side view of FIG. 3, so that the upper end portion 34A and the lower end portion 34B are offset (project) on the back side, and the upper end portion 34A and the lower end portion 34B are configured in such a way that the section between the upper end portion 34A and the lower end portion 34B of the support member 34 on the back side is not in contact with the wiper member 32. Because of this, the support member 34 has a configuration where the sliding (rotational motion) resistance of the wiper member 32 with respect to the support member 34 is reduced.

Additionally, the section between the upper end portion 34A and the lower end portion 34B of the support member 34 on the front side is configured to contact the wiper member 32, so that when the surface 60A of the head 60 is cleaned with the wiper member 32, the support member 34 can support the wiper member 32 from the inner side.

Likewise, the belt members 36 are configured by forming long band-like members in loops, and guide members 38 in substantially tabular shapes that are long and narrow and move in the tape width direction are disposed at an inner side of the belt members 36. That is, the guide members 38 are disposed at inner side of the belt members 36 in such a way that the belt members 36 double back at both end portions in the movement direction (upper end portions 38A and lower end portions 38B shown in FIG. 3 and FIG. 5A) of the guide members 38.

Additionally, the lower end portions 38B of the guide members 38 serve as belt entrainment portions about which the belt members 36 are entrained in such a way as to double back, and the belt members 36 are entrained with their axial direction coincident with the tape lengthwise direction about the guide members 38 in such a way that the belt members 36 can slide (rotationally move) in forward and reverse directions with respect to the guide members 38.

Specifically, the upper end portions 38A and the lower end portions 38B of the guide members 38 are configured as circular arc surfaces whose diameter is larger than the plate thickness of the guide members 38 as seen in the side view of FIG. 3, so that the upper end portions 38A and the lower end portions 38B are offset (project) on the back side, and the upper end portions 38A and the lower end portions 38B are configured in such a way that the sections between the upper end portions 38A and the lower end portions 38B of the guide members 38 on the back side are not in contact with the belt members 36. Because of this, the guide members 38 have a configuration where the sliding (rotational motion) resistance of the belt members 36 with respect to the guide members 38 is reduced.

Moreover, the lower end portions 38B of the guide members 38 have tapered surfaces 38C that continue sharply with respect to the vertical (up and down) direction from the back side (the circular arc surfaces) to the front side as seen in the side view of FIG. 3, and the sides (distal end sides) below the circular arc surfaces are formed in substantially right triangular shapes, as seen in a side view, that project sharply downward. Because of the tapered surfaces 38C, when the guide members 38 move in the tape width direction, the belt members 36 can smoothly contact the edge portions of the recording tape T.

Furthermore, the lower end portions 38B of the guide members 38 project further downward (toward the wiping motion side) than the lower end portion 34B of the support member 34, so that the pair of belt members 36 can contact the recording surface of the recording tape T and separate the recording tape T from the surface 60A of the head 60 before the wiper member 32 contacts the surface 60A of the head 60.

The belt members 36 are preferably configured by a urethane resin or Teflon (registered trademark), for example, which are flexible and can be processed thin, so that the belt members 36 can smoothly move with respect to the outer peripheral surfaces of the guide members 38 and so that the belt members 36 have a low coefficient of friction with respect to the guide members 38 and can be in close contact with the shapes of the upper end portions 38A and the lower end portions 38B of the guide members 38.

Furthermore, the wiper member 32 is preferably configured by a material whose surface has a raised nap, for example, so that the wiper member 32 can appropriately wipe the surface 60A of the head 60. The wiping function may also be given just to the section of the wiper member 32 that contacts the surface 60A of the head 60. Moreover, the wiper member 32 may also be configured in such a way that it can be replaced.

Figure 2:
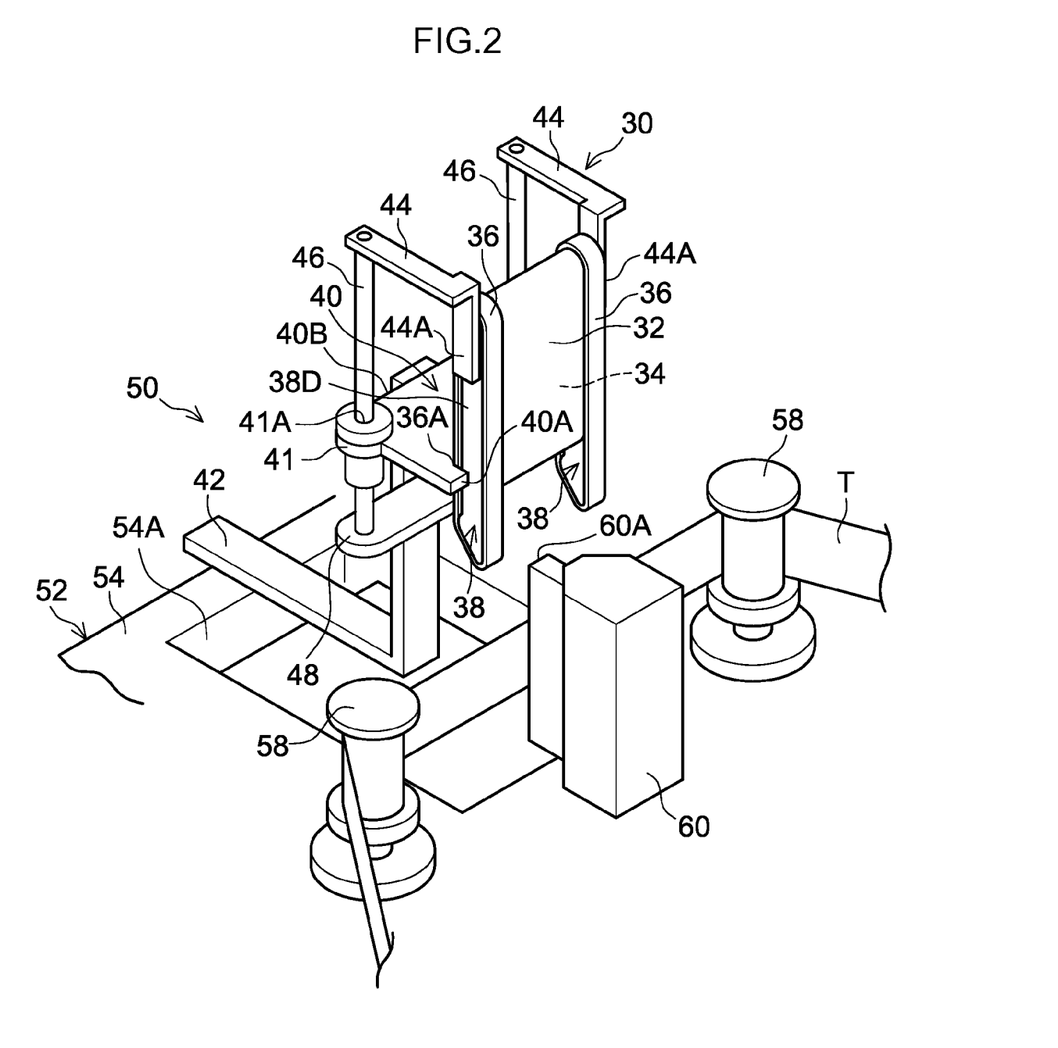
FIG. 2 is a perspective view showing the configuration of the head cleaning device pertaining to the embodiment.
Figure 4:
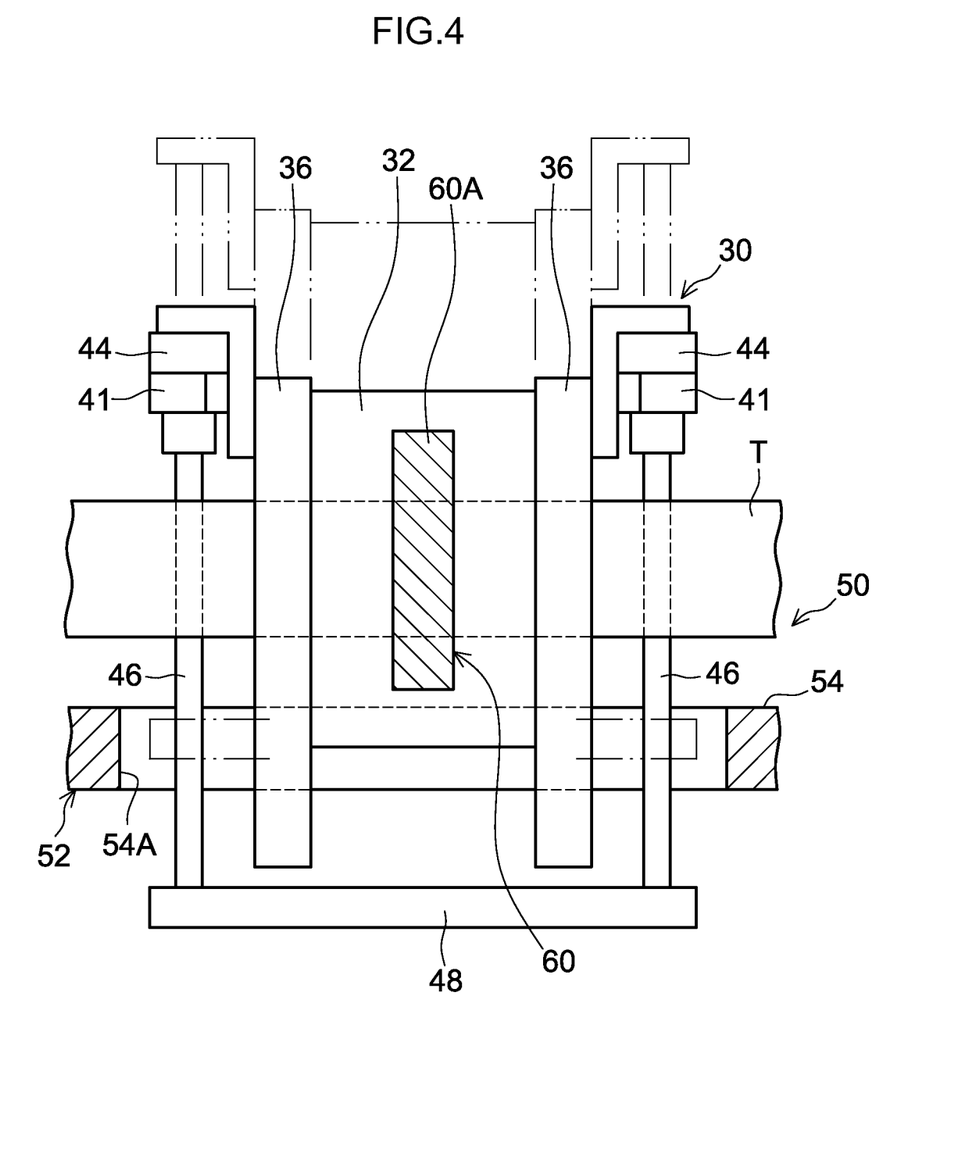
FIG. 4 is a partial sectional front view taken along line X-X of FIG. 3 and seen from the direction of the arrows.

Furthermore, as shown in FIG. 2 to FIG. 4, the support member 34 and the guide members 38 are integrally formed adjacent to one another in the tape lengthwise direction, and the upper end portions of both tape lengthwise direction outside walls 38D of the guide members 38 are fixed to end portions (lower end portions) 44A of a pair of suspension members 44 each having a substantially "L" shape as seen in a side view.

Furthermore, a part of the surface of the wiper member 32 on the opposite side of the surface opposing the surface 60A is anchored to a side edge portion 40A of a base member 40 in a rectangular tabular shape, and that anchored section serves as a wiper anchoring portion 32A. Likewise, parts of the surfaces of the belt members 36 on the opposite side of the surfaces opposing the surface 60A of the head 60 are anchored to the side edge portion 40A of the base member 40, and those anchored sections serve as belt anchoring portions 36A.

Furthermore, the central section of a side edge portion 40B of the base member 40 on the opposite side of the side edge portion 40A to which the wiper anchoring portion 32A and the belt anchoring portions 36A are anchored is fixed to the upper end portion of a support bracket 42 having a substantially "L" shape as seen in a side view, and the lower end portion of the support bracket 42 is fixed to the bottom plate 54 of the casing 52 (the drive device 50).

Additionally, guide tube portions 41 include in their central sections through holes 41A running in the up and down direction are integrally disposed on the corner sections of the side edge portion 40B of the base member 40, and guide rods 46 are inserted through the through holes 41A in the guide tube portions 41. Additionally, the other end portions of the suspension members 44 are fixed to the upper end portions of the guide rods 46.

Furthermore, the lower end portions of the guide rods 46 are fixed to both end portions of a ascending and descending plate 48 in a tabular shape that is long and narrow in the tape lengthwise direction. The ascending and descending plate 48 is moved up and down by a non-illustrated and known raising and lowering mechanism (moving mechanism) such as a solenoid, an air cylinder, or a rack and pinion, so that the guide rods 46 synchronously slide inside the guide tube portions 41 to simultaneously (integrally) raise and lower (move up and down) the support member 34 and the guide members 38 via the suspension members 44.

That is, the wiper member 32 and the belt members 36 can be raised and lowered between an upper position, in which the ascending and descending plate 48 is in contact with the lower end surfaces of the guide tube portions 41, and a lower position (see FIG. 4), in which the suspension members 44 are in contact with the upper end surfaces of the guide tube portions 41. In the bottom plate 54 of the casing 52, there is formed an open portion 54A having a rectangular shape as seen in a plan view for allowing the ascending and descending plate 48, the wiper member 32 (the support member 34), and the belt members 36 (the guide members 38) to move downward.

<Action of Head Cleaning Device>

Next, the action of the head cleaning device 30 having the above-described configuration will be described below.

When the head cleaning device 30 is not cleaning the head 60, the head cleaning device 30 stands by in the upper position in which the ascending and descending plate 48 is in contact with the lower end surfaces of the guide tube portions 41. When the head 60 is to be cleaned, a user operates a non-illustrated console of the drive device 50. Then, the rotation of the reel 10 and the reel 20 stops and the non-illustrated raising and lowering mechanism is driven to lower the ascending and descending plate 48.

When the ascending and descending plate 48 starts to descend, the guide rods 46 start to slide downward inside the guide tube portions 41, and the support member 34 and the guide members 38 start to descend via the suspension members 44. That is, the wiper member 32 and the belt members 36 start to move (in the tape width direction) from the upper position to the lower position.

Here, the wiper anchoring portion 32A of the wiper member 32 entrained about the support member 34 in such a way that it may freely slide (rotationally move) on the support member 34, and the belt anchoring portions 36A of the belt members 36 entrained about the guide members 38 in such a way that they may freely slide (rotationally move) on the guide members 38 are anchored (anchored so as to not move in the tape width direction) to the side edge portion 40A of the base member 40.

Accordingly, in accompaniment with the downward movement of the support member 34 and the guide members 38, the wiper member 32 and the belt members 36 rotationally move relatively with respect to the support member 34 and the guide members 38 in the clockwise direction (indicated by arrow F) in FIG. 3.

Figure 5A:
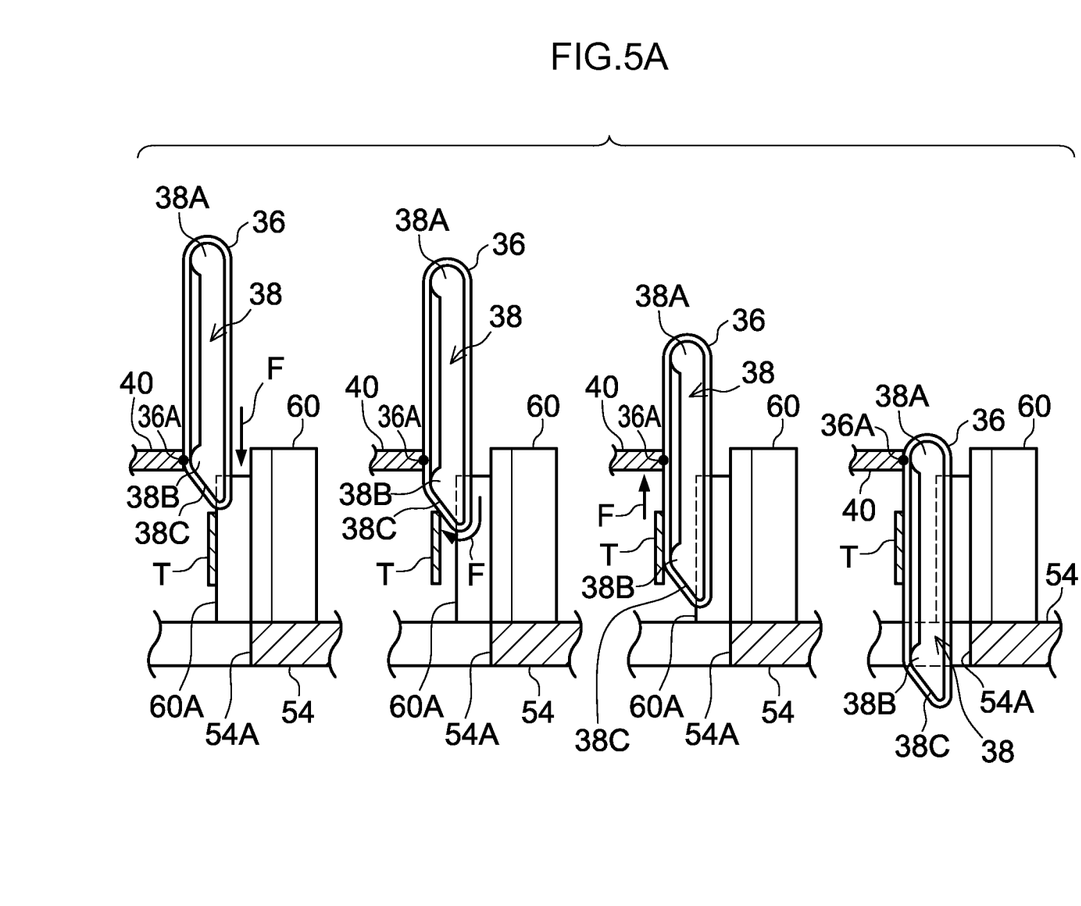
FIG. 5A is an explanatory diagram showing a process of separating a recording tape from a head.

That is, as shown in FIG. 5A, when the guide members 38 descend, the parts (the surface sections supported by the tapered surfaces 38C) on the belt anchoring portion 36A sides (the back sides) of the belt members 36 entrained about the lower end portions 38B of the guide members 38 contact the recording surface of the recording tape T while rotationally moving relatively in the direction of arrow F with respect to the guide members 38.

Here, the lower end portions 38B of the guide members 38 have the tapered surfaces 38C that slope sharply from the back side to the front side. Accordingly, in accompaniment with the descent of the belt members 36, the belt members 36 gradually (along the tapered surfaces 38C) come into contact first with the edge portion of the recording tape T and then with the recording surface of the recording tape T, and in accompaniment with this (because of the thickness of the guide members 38) the belt members 36 can separate the recording tape T from the surface 60A of the head 60.

At this time, at the belt anchoring portion 36A sides of the belt members 36 that come into contact with the recording surface of the recording tape T while rotationally moving, no up and down motion occurs (it is cancelled out) because the belt members 36 ascend with respect to the guide members 38 at substantially the same speed at which the guide members 38 descend. That is, the belt members 36 come into contact with the recording surface of the recording tape T without sliding relatively in the tape width direction on the recording surface of the recording tape T. Accordingly, problems such as the recording tape T that has been separated from the surface 60A of the head 60 by the belt members 36 getting wrinkled do not occur.

Figure 5B:
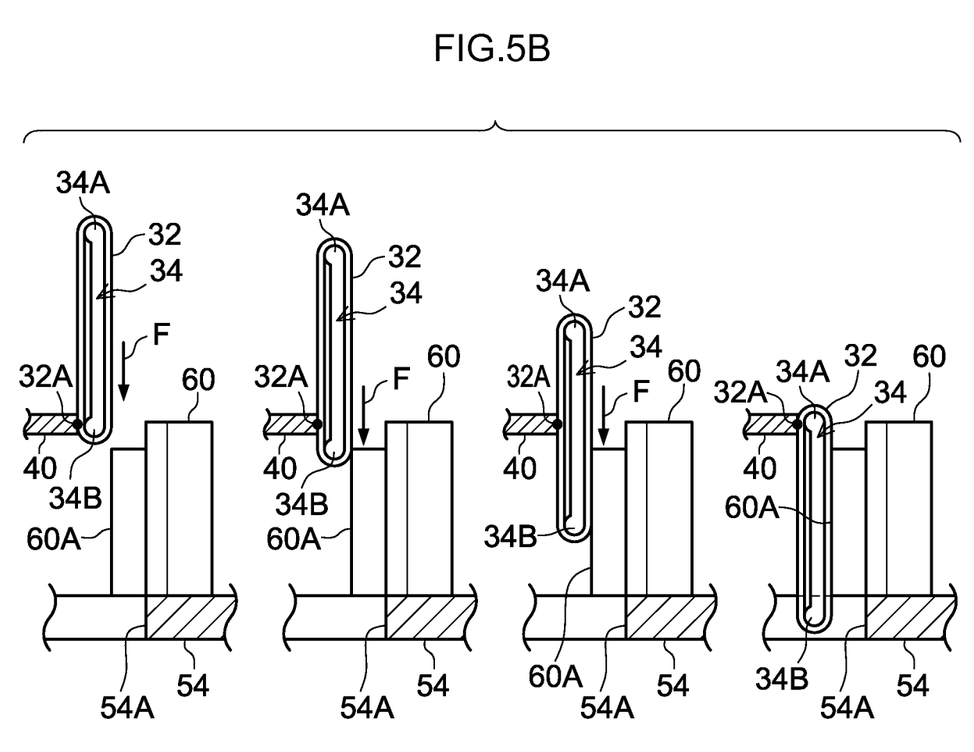
FIG. 5B is an explanatory diagram showing a process of cleaning the head.

Meanwhile, as shown in FIG. 5B, when the support member 34 descends, the front side—which is opposite the wiper anchoring portion 32A side (the back side)—of the wiper member 32 entrained about the lower end portion 34B of the support member 34 contacts the surface 60A of the head 60 while rotationally moving relatively in the direction of arrow F with respect to the support member 34.

Here, the wiper member 32 that comes into contact with the surface 60A of the head 60 while rotationally moving comes into contact with the surface 60A of the head 60 while sliding (rubbing) relatively in the tape width direction on the surface 60A of the head 60. That is, the wiper member 32 descends while rotationally moving (while sliding in the direction of arrow F) relatively with respect to the support member 34, so the distance that the wiper member 32 slides on the surface 60A of the head 60 becomes twice what it is in a configuration where the wiper member 32 is fixed to the support member 34 and descends.

Accordingly, foreign matter (dirt) such as dust sticking to the surface 60A of the head 60 can be efficiently removed. That is, according to the head cleaning device 30, the surface 60A of the head 60 can be excellently cleaned while the recording tape T is separated from the surface 60A of the head 60 by the single movement (descent) in the tape width direction from the upper position to the lower position.

Furthermore, the head cleaning device 30 includes the wiper member 32 which is entrained about the support member 34 in such a way that it may freely slide (rotationally move) on the support member 34, and the belt members 36 which are entrained about the guide members 38 in such a way that they may freely slide (rotationally move) on the guide members 38, and it suffices just to give the head cleaning device 30 a configuration where these are simultaneously (integrally) raised and lowered, so the configuration of the head cleaning device 30 including the raising and lowering drive system can be simplified (the head cleaning device 30 can be simply configured).

Accordingly, a space for installing the head cleaning device 30 in the drive device 50 can also be saved. In this way, the head cleaning device 30 pertaining to the present embodiment can be particularly effectively applied to the drive device 50 into which the pair of reels 10 and 20 are non-removably built.

When the cleaning of the surface 60A of the head 60 by the head cleaning device 30 ends, the ascending and descending plate 48 (the support member 48) is raised by the driving of the raising and lowering mechanism. Then, the wiper member 32 that moves away from the surface 60A of the head 60 while rotationally moving in the opposite direction of the direction of arrow F moves away from the surface 60A of the head 60 while sliding (rubbing) relatively in the tape width direction on the surface 60A of the head 60. Accordingly, foreign matter (dirt) can be kept or prevented from remaining on the surface 60A of the head 60.

Furthermore, the belt members 36, that move away from the recording surface of the recording tape T while rotationally moving in the opposite direction of the direction of arrow F, move away from the recording surface of the recording tape T without sliding relatively in the tape width direction on the recording surface of the recording tape T. That is, the belt members 36 can bring the recording tape T closer to the surface 60A of the head 60 gradually (along the tapered surfaces 38C) in accompaniment with the ascent of the support members 38, and can bring the recording tape T back into contact with the surface 60A of the head 60 by completely moving away from the recording tape T.

The head cleaning device 30 and the drive device 50 pertaining to the present embodiment have been described above on the basis of the drawings, but the head cleaning device 30 and the drive device 50 pertaining to the present embodiment are not limited to what is illustrated in the drawings and can undergo appropriate design changes without departing from the spirit of the present invention. For example, the wiper member 32 and the belt members 36 may also be given a configuration where they are not configured in loops but are paid out from non-illustrated pay-out reels.

Furthermore, it suffices for the head cleaning device 30 pertaining to the present embodiment to include at least one of the wiper member 32 (the support member 34) and the belt members 36 (the guide members 38). For example, the head cleaning device 30 may also be given a configuration where the head 60 is wiped by the wiper member 32 (the support member 34) while the recording tape T is separated from the head 60 by a separation mechanism separate from the belt members 36 (the guide members 38), or may also be given a configuration where the head 60 is cleaned by a separate cleaning member (not shown in the drawings) while the recording tape T is separated from the head 60 by the belt members 36 (the guide members 38).

What is claimed is:

1. A head cleaning device, comprising:
   a wiper member formed in an elongate shape and having a wiper anchoring portion anchored so as not to move in a tape width direction; and
   a support member that includes a wiper entrainment portion about which the wiper member is entrained so as to double back, that causes the wiper entrainment portion to move in the tape width direction so that a surface of the wiper member at an opposite side of the wiper entrainment portion from the wiper anchoring portion wipes a head that performs at least one of writing information to, or reading information from, a recording tape.

2. The head cleaning device according to claim 1, wherein:
   the wiper member is configured in a loop, and the support member is disposed at an inner side of the wiper member such that the wiper member doubles back at both ends in a movement direction of the support member.

3. The head cleaning device according to claim 1, further comprising:
a belt member formed in an elongate shape and having a belt anchoring portion anchored so as not to move in the tape width direction; and
a guide member that includes a belt entrainment portion about which the belt member is entrained so as to double back, and that causes the belt entrainment portion to move in the tape width direction so as to separate the recording tape from the head while causing a surface of the belt member on the belt anchoring portion side of the belt entrainment portion to contact the recording tape.

4. The head cleaning device according to claim 3, wherein:
the belt member is configured in a loop, and
the guide member is disposed at an inner side of the belt member such that the belt member doubles back at both ends in a movement direction of the guide member.

5. The head cleaning device according to claim 3, wherein the wiper entrainment portion of the support member and the belt entrainment portion of the guide member are configured to move simultaneously.

6. The head cleaning device according to claim 3, wherein the belt member and the guide member are both disposed at both tape lengthwise direction sides of the wiper member and the support member.

7. The head cleaning device according to claim 6, wherein the belt member and the guide member project further toward a wiping motion side in the tape width direction, than the wiper member and the support member.

8. A head cleaning device, comprising:
a belt member formed in an elongate shape and having a belt anchoring portion anchored so as not to move in a tape width direction;
a guide member including a belt entrainment portion about which the belt member is entrained so as to double back, and that causes the belt entrainment portion to move in the tape width direction so as to separate a recording tape from the head while causing a surface of the belt member on the belt anchoring portion side of the belt entrainment portion to contact the recording tape; and
a cleaning member which, by moving in the tape width direction, cleans a head that performs at least one of writing information to, or reading information from, the recording tape.

9. A head cleaning device, comprising:
a wiper member that is entrained about a support member in a loop and that has an axial direction that is coincident with a tape lengthwise direction, with a part of the wiper member being anchored to a base member fixed to a device body of a drive device, and that, due to the support member moving in a tape width direction, wipes a head that performs at least one of writing information to, or reading information from, a recording tape;
belt members entrained about guide members in loops and having an axial direction that is coincident with the tape lengthwise direction, the guide members being disposed at both tape lengthwise direction sides of the support member so as to project further toward a wiping motion side in the tape width direction than the support member, with parts of the belt members being anchored to the base member, and the belt members separating the recording tape from the head while contacting the recording tape, due to the guide members moving in the tape width direction; and
a moving mechanism that moves the support member and the guide members in the tape width direction.

10. A drive device, comprising:
a head that performs at least one of writing information to, and reading information from, a recording tape while contacting the recording tape, which is traveling;
a tape drive mechanism that causes the recording tape to travel reciprocally; and
the head cleaning device according to claim 1.

11. The drive device according to claim 10, wherein the tape drive mechanism has a pair of reels that retain the recording tape such that they can pay out and take up the recording tape, and that are non-removably built into a device body.

12. A drive device, comprising:
a head that performs at least one of writing information to, and reading information from, a recording tape while contacting the recording tape, which is traveling;
a tape drive mechanism that causes the recording tape to travel reciprocally; and
the head cleaning device according to claim 8.

13. The drive device according to claim 12, wherein the tape drive mechanism has a pair of reels that retain the recording tape such that they can pay out and take up the recording tape, and that are non-removably built into a device body.

14. A drive device, comprising:
a head that performs at least one of writing information to, and reading information from, a recording tape while contacting the recording tape, which is traveling;
a tape drive mechanism that causes the recording tape to travel reciprocally; and
the head cleaning device according to claim 9.

15. The drive device according to claim 14, wherein the tape drive mechanism has a pair of reels that retain the recording tape such that they can pay out and take up the recording tape, and that are non-removably built into a device body.

* * * * *